United States Patent Office 3,429,738
Patented Feb. 25, 1969

3,429,738
POLYVINIC CHLORIDE RESIN PARTICLES OVERCOATED WITH A POLYMERIC FLUORINE CONTAINING RESIN
Frank J. Donat, Cleveland, Ohio, assignor to The B. F. Goodrich Company, New York, N.Y., a corporation of New York
No Drawing. Filed Aug. 10, 1966, Ser. No. 571,429
U.S. Cl. 117—100        2 Claims
Int. Cl. B44d *1/22;* C08f *29/24*

ABSTRACT OF THE DISCLOSURE

Poly(vinyl chloride) resin is improved for injection molding by coating the individual resin particles with a layer of a fluoro polymer which is incompatible with the base PVC, forms a matrix around the PVC particles, and keeps the coated PVC particles separated from direct contact with each other, hence easily movable in relationship to each other, in the waxy fluorocarbon matrix as the mold is filled. At the molding temperature, the outer phase overcoat fluoro polymer fuses and fluxes or disperses into the PVC particle, becoming an inner phase. The molded article evinces properties of poly(vinyl chloride) only.

---

This invention is concerned with the preparation of synthetic resins having superior properties for molding, particularly for injection molding at relatively high temperatures. Poly(vinyl chloride) is typical of the synthetic resins that can be upgraded into excellent injection molding materials by the practice of the invention.

Poly(vinyl chloride) is a widely used man-made resin. It can be milled and shaped, dissolved and cast into films, and extruded or molded into rigid forms. The techniques for shaping a plastic resin generally involve melt flow of the polymer at some stage in the process. Despite its popularity with resin fabricators, poly(vinyl chloride) has an inherently high melt viscosity at normal fabricating temperatures (150°–200° C.) coupled with relatively poor heat stability. Therefore processes for fabricating poly(vinyl chloride) articles tend to be slower in operation than is desirable. Occasionally, depending on the thickness and configuration of the article being produced, sufficient melt flow of the resin will be impossible to achieve in an injection molding operation without compromising some of the resin's basically favorable properties. Normal molecular weight poly(vinyl chloride) i.e. resin with a weight average molecular weight greater than 100,000 cannot be injection molded without using such extreme conditions that the resin is degraded. The practice has been to use a lower molecular weight resin for injection molding operations. This practice sacrifices thermal stability, tensile strength and other properties in the articles produced.

It has been recognized that if the resin can be made to flow as individual particles instead of as a single viscous mass, improved molding properties can be obtained. The particles can then be fused into a single mass at a late stage in the forming operation. This concept has led to the so-called special molding resins which do exhibit improved processibility over standard grade poly(vinyl chlorides). Even these so-called special molding resins, based on hard, spherical particles, and which have lower melt flow viscosities than standard grade poly(vinyl chloride) resins, based on porous, fusible particles that form honey-like masses under molding conditions, are believed to form a matrix in which the particles move. This matrix is created by partial fusion of the surface of the particles. When the resin particles are entirely poly (vinyl chloride), the matrix is also poly(vinyl chloride), and as the particles are thus moving in a viscous poly (vinyl chloride) matrix, they do not have the optimum processing characteristics. At the high temperatures employed in injection molding even the special molding resins go into viscous melt flow and the resins are not usable in injection molding apparatus.

This invention provides poly(vinyl chloride) resins with improved melt flow and molding properties. It provides for modification of the resin particles to allow controlled fusion. The modified polymers of the invention process by true particle flow and are fused at some late stage in the molding cycle by the application of extra heat. The powder blend extrusion that is possible with these new resins, when compared to molding techniques using pelleted resins offers the advantages of better heat stability, less waste, easier scrap rework, and better product quality. Application of fusing heat only late in the molding cycle leads to a more moderate heat history for the polymer than is otherwise obtainable. Controlled fusibility is achieved by coating the resin particles with selected polymeric coatings. The chemical nature of this polymer overcoat is selected to be such that it is incompatible with the poly(vinyl chloride) making up the bulk of the particle.

The favored materials for use as the overcoat polymers in the practice of this invention are polymeric resins containing fluorine substituent groups. Fluoro carbon polymers tend to be incompatible with most other manmade synthetic resins and give the highest interfacial tension between overpolymers and the poly(vinyl chloride) core. The fluorine containing polymers have excellent lubricating properties. They thus make excellent overcoat materials for resin particles, forming extremely thin films around the subject particles and providing good slip characteristics between the coated particles as said particles are forced under heat and pressure into some configuration in a mold. Poly(vinyldichlorodifluorocyclobutane) and polyfluoro carbon acrylates and methacrylates of the formula

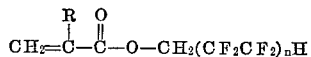

wherein R is hydrogen or a methyl radical and *n* is an integer from 2–6 inclusive are excellent materials for use in this invention although any polymerizable fluoro carbon may be used. These polyfluoroalkyl acrylates and methacrylates are readily prepared by reacting acrylic acid, methacrylic acid, their halides or anhydrides with a tetrafluoroethylene/methanol telomer of the formula

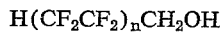

when *n* is an integer from 2–6 inclusive as described in United States Patents 2,559,628, and 2,628,958. The compatibility of the overpolymer with the poly(vinyl chloride) is readily controlled by forming the overpolymer from a mixture of monomers; one monomer giving a homopolymer incompatible with poly(vinyl chloride) (typically a fluorocarbon, or fluorine containing monomer), the second, or compatibalizing, monomer giving a homopolymer compatible with poly(vinyl chloride). Thus, the degree of compatibility may be varied by adjusting the relative concentration of the true monomer in the polymerization mixture used to form the overpolymer.

It is possible to employ copolymers of these fluorine containing materials mentioned above with one or more various other vinyl monomers copolymerizable therewith. For the purpose of this invention vinyl monomers which may be employed as comonomers include those having a $CH_2=C<$ grouping. Such monomers include vinyl chloride, vinyl bromide, vinylidene chloride, and the like; the vinyl esters such as vinyl acetate, vinyl benzoate, isopropenyl acetate, and the like; the acrylate and methacrylate esters such as methyl acrylate, ethyl acrylate, the octyl acrylates, phenyl acrylate, cyclohexyl acrylate, and the corresponding methacrylates, the maleate and fumarate esters such as diethyl maleate, dimethyl fumarate, and the like; the vinyl aromatic monomers such as styrene, the vinyl toluenes, the vinyl xylenes, vinyl naphthalene, and the like; the monoolefins, such as ethylene, propylene, cyclohexene, and the like; the vinyl ethers, such as vinyl methyl ether, vinyl benzyl ether, and the like; the allyl esters and ethers, such as allyl acetate, allyl ethyl ether, and the like; vinyl cyanides, such as acrylonitrile, methacrylonitrile, and the like and others.

The poly(vinyl chloride) resins included herein are the homopolymers of vinyl chloride, and copolymers and interpolymers of at least 70% by weight of vinyl chloride and up to 30% by weight of one or more various other vinyl monomers copolymerizable with vinyl chloride including the variety of vinyl monomers named above as comonomers for the fluoroalkyl acrylates.

Most preferred as base polymers for the practice of this invention are homopolymer resins of poly(vinyl chloride). Poly(vinyl chloride) homopolymer and copolymer resins are widely available on the market. They are thermoplastics, and have specific gravities from about 1.35 to 1.40 at room temperature. They may contain added plasticizers, stabilizers, lubricants, coloring agents and fillers.

The resin modification principle of this invention is applicable to other resins than poly(vinyl chlorides). An incompatible poly fluorocarbon overcoat can be applied by the same techniques to poly(methyl methacrylate), poly(alkylacrylates), including poly(ethyl acrylate), poly (propyl acrylate) and poly(butyl acrylate), poly(styrene), poly(alpha-methyl styrene), poly(acrylonitrile) and the like.

The degree of compatibility between the poly(vinyl chloride) resin and the overcoat polymer is conveniently varied by changing the ratios of comonomer in the system. Poly 1,1-dihydroperfluoropropyl methacrylate is not compatible with poly(vinyl chloride), but poly(methyl methacrylate) is compatible therewith, and copolymers of 1,1-dihydroperfluoropropyl methacrylate and poly(methyl methacrylate) have varying degrees of compatibility with poly(vinyl chloride) depending on the relative composition of the copolymer. Less compatible overcoats are important in application to high shear processes such as injection molding; while more compatible overcoats are preferable in low shear fabrication such as pipe extrusion.

Briefly this invention calls for the overpolymerization of an inexpensive base resin having fairly poor processing properties with a very small amount of a presently more costly material incompatible with the base resin. The high interfacial tension between the overpolymer and the poly (vinyl chloride) keeps the poly(vinyl chloride) resin particles separated as an internal phase and prevents their fusion into one molten mass during the early stages of processing. An inversion or fusion of the overpolymer which occurs at fairly high temperatures is delayed until late in the fabrication cycle and is accomplished with a short period of extra heat. In this inversion, the poly(vinyl chloride) becomes the external phase and to all appearances the article is then made up solely of poly(vinyl chloride). Only a chemical analysis will detect the fluorine containing material; it is not evident by physical inspection.

The invention makes it possible to injection mold normal molecular weight (weight average molecular weight greater than 100,000) poly(vinyl chloride) and to extrude poly(vinyl chloride) and other shapable resins at faster rates than is possible in the current art.

The selection of the overpolymer materials is critical for certain compatibility, melt surface tension, and melt viscosity requirements must be met. The more compatible the overpolymer is with poly(vinyl chloride), that is, the lower the interfacial tension between the two polymer melts, the easier it will be to weld all of the poly(vinyl chloride) particles into a single viscous mass either by pressure, mechanical work or increased temperature. The severity of the shear stresses encountered in the fabrication cycle will determine the required degree of compatibility between the overpolymer and the base poly(vinyl chloride). Processes involving high shear stresses such as are encountered in injection molding or high speed extrusion, wire coating and the like require maximum incompatibility at the processing temperature to maintain particle flow.

Fluoroalkyl acrylates and methacrylates are readily overpolymerized on poly(vinyl chloride) resin. A free radical initiation catalyst is dissolved in the fluoroalkyl acrylate or fluoroalkyl acrylate-comonomer mixture and charged to a reaction vessel. The poly(vinyl chloride) resin is added under an inert atmosphere. As agitation proceeds, the monomer-initiator solution is absorbed on the poly(vinyl chloride) and a dry powder mass forms. Water is added to serve as a heat transfer medium and the batch is agitated at 75° C. for 16 hours. A free flowing slurry results. The slurry is filtered, washed with water, then with methanol and finally dried at 50° C. under vacuum. A typical overpolymerization recipe is:

| Ingredients: | Parts by weight |
| --- | --- |
| Water | 300 |
| Poly(vinyl chloride) | 150 |
| Fluoroalkyl acrylate | 5–15 |
| Comonomer (with fluorocompound) | 0–5 |
| Initiator | 0.1–0.1 |

For comparison with the overcoated poly(vinyl chlorides) of this invention, polymers and copolymers of the polymerizable fluoro carbons may be made and blended with poly(vinyl chloride).

Copolymers of fluoroalkyl acrylates and fluoroalkyl methacrylates are readily prepared with a wide variety of polymerizable vinyl monomers. Free radical initiation is employed. Typical initiators include peroxides, azo compounds and redox catalysts. Preferred initiator materials include benzoyl peroxide, chlorinated benzoyl peroxide, dicumyl hydroperoxide, caprylyl peroxide, diisopropyl percarbonate, azoisobutylronitrile, potassium persulfate, and the like. Free radical initiator is employed in the range of about 0.01 part to 1.0 part per hundred parts of monomer. Polymerizations are preferably conducted in an inert, oxygen-free atmosphere at about 75° C.

A typical polymerization recipe for the reaction is:

| Ingredient: | Parts by weight |
| --- | --- |
| Water | 300 |
| Fluoroalkyl acrylate | 25–50 |
| Comonomer | 0–30 |
| Initiator | 0.01–1.0 |
| Sodium stearate | 1.0–1.5 |

Water, peroxide initiator, sodium stearate and monomers are charged under nitrogen. The vessel is then agitated for 15–20 hours at a temperature of about 75° C. The latex is coagulated with calcium chloride, filtered, washed with water and dissolved in tetrahydrofuran to insure homogeneity. Polymer is precipitated with methanol, filtered, washed with water and dried at 50° C. Films can be pressed from these polymers and they are readily analyzed by infra-red spectra techniques.

Polymers prepared in the course of illustrating this invention have been evaluated by a laboratory test device which is essentially a constant force rheometer. It consists primarily of a barrel, or cylinder equipped to maintain a constant pressure and temperature in which the sample material preformed into a pill shape is inserted, a piston of known area to which a constant load or shear force is applied, and an outlet die through which the polymer is forced as a shaped extrudate. In a test run, the extrudate is cut at definite time intervals. The weight of material accumulated at each cut is translatable into weight of material extruded per unit of time. The extrudate is measured for percent swell and examined for surface regularity and smoothness. The higher the shear that can be employed without producing roughness of the extrudate surface, the better the extrusion is said to be.

The following examples, in which parts are parts by weight, will serve to illustrate the invention.

Example I

A standard, high molecular weight (approximately 120,000), commercial poly(vinyl chloride) resin, intrinsic viscosity in cyclohexene at 25° C.=1.10–1.20, specific viscosity=0.56, porosity=280 is overpolymerized in the following recipe with a variety of fluoroalkyl acrylates and fluoroalkyl methacrylates and copolymers thereof. Benzoyl peroxide is dissolved in the monomer system and added to the dry poly(vinyl chloride). The mixture is shaken under nitrogen until the resin appears to be dry. Water is charged and the bottle is sealed under nitrogen. The bottle is rotated for 15.5 hours in a constant temperature bath at 75° C. Product slurries are filtered, washed with water and then with methanol and dried at 50° C. under vacuum. All polymers have the physical appearance of the poly(vinyl chloride) resin.

| Ingredient | M | N | O | P |
|---|---|---|---|---|
| Poly(vinyl chloride) | 100 | 100 | 100 | 100 |
| Fluoropropyl acrylate/styrene (50/50) | 10 | | | |
| Fluoropentyl acrylate/styrene (60/40) | | 10 | | |
| Fluoropropyl methacrylate/styrene (80/20) | | | 10 | |
| Fluorononyl methacrylate/styrene (80/20) | | | | 10 |
| Butyl tin mercaptide | 3 | 3 | 3 | 3 |

When these alloys are run in the constant force rheometer test, the materials are all found to process at about 1.0, the level of the 100% poly(vinyl chloride) resin control. The shearing action of the mill mixing has forced the fluoroacrylate and fluoromethacrylate copolymers into the inner phase; their separate identities are lost; the materials act the same as pure poly(vinyl chloride).

This example is repeated, making alloys of poly(vinyl chloride) and methyl methacrylate/fluoroalkyl acrylates and methylmethacrylate/fluoroalkyl methacrylates, vinyl chloride/fluoroalkyl acrylates and vinyl chloride/fluoroalkylmethacrylates, and acrylonitrile/fluoroalkyl

| | PVC control | A | B | C | D | E |
|---|---|---|---|---|---|---|
| Ingredient: | | | | | | |
| Water | | 300 | 300 | 300 | 300 | 300 |
| Poly(vinyl chloride) | | 150 | 150 | 150 | 150 | 150 |
| Fluoropropyl acrylate | | 15 | | | 4.0 | |
| Fluoropentyl acrylate | | | | 15 | | |
| Fluorononyl acrylate | | | | | | 7.4 |
| Fluorononyl methacrylate | | | 15 | | 11.0 | 7.6 |
| Benzoyl peroxide | | 0.1 | 0.1 | 0.1 | 0.1 | 0.1 |
| Test data: | | | | | | |
| T₁° C. (glass transition temp.) | 98 | 92 | 94 | 92 | 90 | 91 |
| T₂° C. (apparent extrusion temp.)[1] | 158 | 116 | 113 | 108 | 110 | 107 |
| Swell (1,000 lb. load, 170° C., 2 min. preheat) | 0.072 | 0.077 | 0.073 | 0.073 | 0.073 | 0.075 |
| Extrusion rate: (constant force rheometer, control poly(vinyl chloride) as 1.0) 1,500 lb. load | 1.0 | 23.0 | 50 | 21 | 26 | 24 |

[1] Poly(vinyl chloride) and the over coated poly(vinyl chloride) compositions have essentially the same melt temperature, however, because of the difference in mechanical behavior of the overpolymer, the modified resins actually process or extrude at a lower temperature (T₂) than the poly(vinyl chloride) control even though the glass transition temperature remains essentially unchanged.

Example II

The overpolymerization procedure of Example I is employed on the same poly(vinyl chloride) resin and various polymerizable monomers are combined with a fluoroalkyl acrylate or fluoroalkyl methacrylate to form the overpolymer.

acrylates and acrylonitrile/fluoroalkyl methacrylates. In every case the effect of the milling is to disperse the alloying polymer so efficiently in the poly(vinyl chloride) resin that the mass acts as though it were 100 percent poly(vinyl chloride) and the alloying incompatible polymer has no measurable effect on the poly(vinyl chloride) resin extrusion properties.

| | PVC control | F | G | H | I | J | K | L |
|---|---|---|---|---|---|---|---|---|
| Ingredient: | | | | | | | | |
| Water | | 300 | 300 | 300 | 300 | 300 | 300 | 300 |
| Poly(vinyl chloride) | | 150 | 150 | 150 | 150 | 150 | 150 | 150 |
| Styrene | | 2.6 | 2.6 | | | | | |
| Methyl methacrylate | | | | 3.7 | 3.1 | 2.5 | | |
| Acrylonitrile | | | | | | | 1.5 | |
| Vinyl chloride | | | | | | | | 2.7 |
| Fluoropentyl acrylate | | | | 11.3 | | | | 12.3 |
| Fluoroheptyl acrylate | | | | | 11.9 | | | |
| Fluorononyl acrylate | | 15.4 | | | | 12.5 | 13.5 | |
| Fluorononyl methacrylate | | | 12.4 | | | | | |
| Benzoyl peroxide | | 0.1 | 0.1 | 0.1 | 0.1 | 0.1 | 0.1 | 0.1 |
| Test data: | | | | | | | | |
| T₁° C. (glass transition temp.) | 98 | 82 | 91 | 91 | 91 | 92 | 91 | 89 |
| T₂° C. (apparent extrusion temp.)[1] | 158 | 101 | 118 | 110 | 108 | 106 | 95 | 105 |
| Swell (1,000 lb. load, 170° C., 2 min. preheat) | 0.072 | 0.076 | 0.075 | 0.071 | 0.069 | 0.071 | 0.080 | 0.072 |
| Extrusion rate: (constant force rheometer control poly(vinyl chloride) as 1.0 1,500 lb. load | 1.0 | >100 | 24 | 23 | 50 | 72 | 51 | 44 |

[1] This is an apparent melt temperature, actually the melt temperature of the poly(vinyl chloride) remains essentially unchanged. However, the overpolymer melts at a lower temperature than the poly(vinyl chloride) and this molten overcoat acts as a lubricant allowing the solid poly(vinyl chloride) to extrude or process as if it itself were melted. Fastest rates correspond to most incompatible overpolymer.

Example III

Physical mixtures or alloys of the poly(vinyl chloride) resin employed in Example I with various fluoroalkyl acrylate and methacrylate homopolymers and copolymers are prepared by mill blending each of the mixtures for 5 minutes at 350° F. The following recipe is used.

Example IV

The poly(vinyl chloride) resin of Example I is overpolymerized with the homopolymer and copolymers of 1-vinyl-2,2-dichloro-3,3-difluoro cyclobutane in the following recipes. Benzoyl peroxide is dissolved in the monomer system, and added to the dry poly(vinyl chloride). The mixture is shaken vigourously under nitrogen until the resin appears to be dry. Water is charged and the reactor is sealed under nitrogen. Polymerization is conducted at 75° C. for 15.5 hours. Product slurries are filtered, water washed, methanol washed and dried under vacuum at 50° C. All polymers have the physical appearance of the poly(vinyl chloride) resin when viewed with the naked eye and under low power stereo microscope.

The overpolymers produced are evaluated in the constant force rheometer and the numerical values given are based on the value for the poly(vinyl chloride) resin alone rated as 1.0.

| Ingredient | Q | R | S |
|---|---|---|---|
| Poly(vinyl chloride) | 150 | 150 | 150 |
| Benzoyl peroxide | 0.3 | 0.3 | 0.3 |
| Water | 300 | 300 | 300 |
| Vinyl dichlorodifluorocyclobutane | 15 | 9.6 | 10.2 |
| Styrene | | 5.4 | |
| Methyl acrylate | | | 4.8 |
| Theoretical percent overpolymer | 9.1 | 9.1 | 9.1 |
| Measured percent overpolymer | 8.55 | 6.84 | 7.41 |
| Rheometer value | 11.3 | 10.4 | 16.8 |

Example V

Copolymers of 1 - vinyl - 2,2 - dichloro - 3,3-difluorocyclobutane with styrene and methylmethacrylate are prepared by charging monomers and catalyst under nitrogen and tumbling the sealed polymerization vessels at 50° C. for 69 hours.

| Ingredients | T | U |
|---|---|---|
| Water | 250 | 250 |
| Sodium stearate | 1.0 | 1.0 |
| Benzoyl peroxide | 0.2 | 0.2 |
| Cyclobutane | 50 | 50 |
| Styrene methylmethacrylate | 50 | |
| Methylmethacrylate | | 50 |

These copolymers are mixed with the poly(vinyl chloride) resin employed in Example IV by combining on a 4 inch mill at 330° F. The mixtures are milled for 5 minutes.

| Ingredient | V | W |
|---|---|---|
| Poly(vinyl chloride) | 50 | 50 |
| Cyclobutane/styrene copolymer | 5 | |
| Cyclobutane/methylmethacrylate copolymer | | 5 |
| Rheometer value | 2.2 | 0.5 |

Alloy type mixtures of fluorocarbon copolymers and poly(vinyl chloride) show virtually no improvement in extrusion properties over undiluted poly(vinyl chloride). When the data of this example is compared with that of Example IV where the fluorocarbon polymer is overpolymerized on the poly(vinyl chloride) it is evident that the overpolymerization procedure of the invention has improved the level of poly(vinyl chloride) extrusion many fold.

I claim:
1. Compositions of matter comprising poly(vinyl chloride) resin including homopolymers of vinyl chloride and copolymers and interpolymers of at least 70% by weight of vinyl chloride and up to 30% by weight of one or more vinyl monomers copolymerizable with vinyl chloride, the weight average molecular weight of said resin being greater than 100,000, the individual particles of said resin comprising an inner phase and being coated with a layer of a polymerized fluoro carbon, said fluoro carbon being selected from the class consisting of 1-vinyl-2,2-difluoro-3,3-dichlorocyclobutane, and fluorocarbon acrylates and fluorocarbon methacrylates, said fluorocarbon acrylates and fluorocarbon methacrylates being of the formula

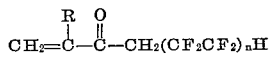

wherein R is hydrogen or a methyl radical and $n$ is an integer from 2 to 6 inclusive as an outer phase, said particles being subject to phase inversion at molding temperatures of 100°–158° C. whereby the said fluorocarbon polymer disperses so completely into said poly(vinyl chloride) that it can be detected only by chemical analysis and the molded or extruded piece has the appearance and properties of only poly(vinyl chloride).

2. The method of improving molding and extrusion properties of poly(vinyl chloride) resins comprising placing said resins in a polymerizable fluoro carbon monomer selected from the class consisting of 1-vinyl-2,2-difluoro-3,3-dichlorocyclobutane, and fluorocarbon acrylates and fluorocarbon methacrylates, said fluorocarbon acrylates and fluorocarbon methacrylates being of the formula

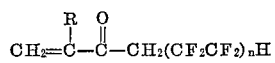

wherein R is hydrogen or a methyl radical and $n$ is an integer from 2 to 6 inclusive, and polymerizing said monomer so that a fluorocarbon polymer coating is formed on the particles of said resin.

References Cited

UNITED STATES PATENTS

| 3,037,948 | 6/1962 | Landler et al. | 260—884 |
| 3,180,908 | 4/1965 | Van Essen et al. | 260—881 |
| 3,240,843 | 3/1966 | Nelson | 260—884 |
| 3,360,590 | 12/1967 | Liepins | 260—884 |

FOREIGN PATENTS

| 1,015,334 | 12/1965 | Great Britain. |

SAMUEL H. BLECH, *Primary Examiner.*

JOHN T. GOOLKASIAM, *Assistant Examiner.*

U.S. Cl. X.R.

260—884, 881